J. D. WEBBER.
WEIGHING APPARATUS.
APPLICATION FILED JAN. 10, 1913.
1,157,350.
Patented Oct. 19, 1915.
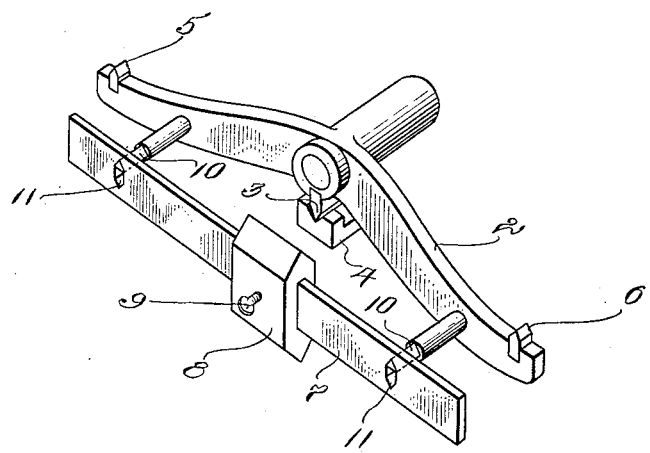
Witnesses:
Inventor:
J. D. Webber,
by Mitchell, Chadwick & Kent,
Attys.

UNITED STATES PATENT OFFICE.

JOHN D. WEBBER, OF BAYONNE, NEW JERSEY, ASSIGNOR TO AUTOMATIC WEIGHING MACHINE COMPANY, OF NEWARK, NEW JERSEY, A CORPORATION OF NEW YORK.

WEIGHING APPARATUS.

1,157,350.  Specification of Letters Patent.  Patented Oct. 19, 1915.

Application filed January 10, 1913. Serial No. 741,173.

*To all whom it may concern:*

Be it known that I, JOHN D. WEBBER, a citizen of the United States, residing at Bayonne, in the county of Hudson and State of New Jersey, have invented new and useful Improvements in Weighing Apparatus, of which the following is a specification.

It is well understood that in the operation of automatic weighing machines account has to be taken of the column in the air, *i. e.*, the falling column of material which is located between the supply valve and the load in the weighing bucket at the instant when said valve closes, since this column in the air is immediately added to the load in the bucket and will give an over-weight unless provision is made for compensating for its effect on the load. My present invention is intended to provide a simple and effective appliance for compensating for this column in the air, and resides in certain features of construction and arrangement hereinafter set forth.

In the accompanying drawing, the figure is a perspective view showing my appliance as preferably constructed and combined with a scale beam.

The scale beam shown at 2 in the drawing is of the equal-arm type, such as is commonly used in automatic weighing machines, and is centrally supported by a downwardly-extending knife-edge fulcrum 3 resting on a fixed fulcrum block 4, being provided with the usual knife-edge fulcrums 5 and 6 for supporting the weighing weight and the receptacle in which the material is weighed. The weighing weight and the receptacle are not illustrated, as they may be of any usual or suitable construction, and it will be understood that the parts above mentioned will have associated with them such other parts of a weighing machine as may be found desirable or convenient in any given case, including means for cutting off the supply of material to the receptacle in which it is weighed as soon as the scale beam poises.

In connection with the beam 2 I provide a weight support which moves with the beam and preferably consists of a bar 7 carried directly by said beam and extending lengthwise thereof. On the bar 7 is mounted a weight 8 the position of which, with respect to the bar, can be adjusted and maintained by sliding the weight along the bar and clamping it thereto in any given position by means of a thumb-screw 9, and provision is made for shifting the effect of the weight 8 from one side of the fulcrum axis of the beam 2 to the other by removably supporting the bar 7 on a pair of upwardly-facing knife-edges 10 projecting laterally from the beam 2 and located on opposite sides of the beam fulcrum 3 at equal distances therefrom, the bar 7 being provided with perforations 11 each adapted to receive one of the knife edges 10. Thus said bar with its adjustable weight can be reversed end for end with respect to the beam 2 and supported thereon in either position.

Preferably the bar 7 and the weight 8 are of uniform transverse section throughout their lengths, respectively, and the perforations 11 are V-shaped at top and bottom to provide for the accurate positioning of the bar on the knife edges 10, however said bar may be placed thereon, the arrangement being such that in any position of the bar the center of gravity of the combined bar and weight will always be located in a line intersecting the fulcrum axis of the beam and extending parallel with the fulcrum line of said beam, that is, a straight line joining the fulcrums 5 and 6.

In use, the bar 7 and weight 8 are removed from the knife edges 10 and a load is then weighed by the machine with the weighing weight set to balance the desired quantity of material, neglecting the effect of the column in the air. The load actually obtained in this manner will be the true weight desired, plus the weight of the column in the air at the time of cutting off the delivery of material to the weighing receptacle. The bar 7 and weight 8 are then placed upon the knife edges 10, and the weight 8 is then moved along the bar toward the weighing weight until the beam 2 balances, whereupon the weight 8 is clamped to the bar by means of the thumb-screw 9. The effect of the weight 8 will then be such as to balance the weight of the column in the air which was added to the load. The bar 7 and weight 8 are then removed and reversed by turning the bar end for end and replacing it on the knife edges 10, the result of which is to diminish the effect of the weighing weight by an amount equal to the weight of the column in the air, and therefore as long as subsequent loads are weighed with the parts in the position last described the scale beam will poise and the delivery of material to the weighing receptacle will be cut off at the instant when the load in the receptacle falls short of containing the correct weight desired by just the weight of the column in the air, which column is immediately added to the material in the receptacle and the correct load is thus made up therein. The accuracy of the weight thus obtained may be tested at any time by merely removing the bar 7 and weight 8 after a load has been completed in the weighing receptacle, whereupon, if the weight of the load is correct, it will just balance the weighing weight and the scale beam 2 will poise.

The appliance above described can be operated quickly and easily and is readily attachable to existing scale beams without alteration of the latter, but it may be combined with a scale beam in various other ways than that illustrated without departing from my invention.

I claim:

1. In a weighing apparatus, the combination with a scale beam of a weight support, a weight adjustable on said support lengthwise of the same, means for securing said weight in adjusted relation to the support, and means connected to and movable with said scale beam for supporting the weight support and permitting it to be freely lifted, reversed end for end and replaced.

2. In a weighing machine, the combination with an equal-arm scale beam having two supports located on opposite sides of and at equal distances from the beam fulcrum, of a bar carried by said supports and adapted to be freely lifted therefrom, reversed end for end and replaced thereon, a weight adjustable longitudinally on said bar, and means for clamping the weight thereto.

3. In a weighing apparatus, the combination with an equal-arm scale beam having two supports located on opposite sides of and at equal distances from the beam fulcrum, of a bar adapted to be reversed end for end and removably mounted on said supports in either position, a weight adjustable longitudinally on said bar, and means for clamping the weight thereto, the center of gravity of the combined bar and weight in any position thereof being located in a line extending parallel with the beam and intersecting its fulcrum axis.

Signed by me at Newark, N. J., this seventh day of January, 1913.

JOHN D. WEBBER.

Witnesses:
WILLIAM BROWN,
G. GOUVERNEUR ASHWEEL.

Copies of this patent may be obtained for five cents each, by addressing the "Commissioner of Patents Washington, D. C."